United States Patent
Miller et al.

(10) Patent No.: US 10,439,716 B2
(45) Date of Patent: Oct. 8, 2019

(54) COMPACT SYSTEM FOR ACTIVE CO-BORESIGHT MEASUREMENT IN A LASER COMMUNICATION SYSTEM

(71) Applicant: Facebook, Inc., Menlo Park, CA (US)

(72) Inventors: Eric Douglas Miller, Sherman Oaks, CA (US); Kevin Michael Birnbaum, Reseda, CA (US); Chien-Chung Chen, Thousand Oaks, CA (US); Andrew Todd Grier, Sherman Oaks, CA (US)

(73) Assignee: Facebook, Inc., Menlo Park, CA (US)

(*) Notice: Subject to any disclaimer, the term of this patent is extended or adjusted under 35 U.S.C. 154(b) by 47 days.

(21) Appl. No.: 15/704,614

(22) Filed: Sep. 14, 2017

(65) Prior Publication Data

US 2019/0081703 A1    Mar. 14, 2019

(51) Int. Cl.
| | | |
|---|---|---|
| H04B 10/00 | (2013.01) | |
| H04B 10/116 | (2013.01) | |
| G01B 11/27 | (2006.01) | |
| H04B 10/114 | (2013.01) | |
| G02B 27/10 | (2006.01) | |
| H04B 10/50 | (2013.01) | |
| H04B 10/54 | (2013.01) | |
| H04B 10/40 | (2013.01) | |

(Continued)

(52) U.S. Cl.
CPC ......... *H04B 10/116* (2013.01); *G01B 11/272* (2013.01); *G02B 26/0816* (2013.01); *G02B 27/106* (2013.01); *H04B 10/1123* (2013.01); *H04B 10/1143* (2013.01); *H04B 10/40* (2013.01); *H04B 10/5057* (2013.01); *H04B 10/541* (2013.01); *H04B 10/516* (2013.01); *H04J 14/005* (2013.01); *H04J 14/08* (2013.01)

(58) Field of Classification Search
CPC .. H04B 10/116; H04B 10/1143; H04B 10/40; H04B 10/5057; H04B 10/541; H04B 10/118; H04B 10/11; H04B 10/1123; H04B 10/25754; H04B 7/022; H04B 7/024; H04B 7/0413; G01B 11/272; G02B 26/0816; G02B 27/106; H04J 14/005; H04J 14/08; H01Q 1/246; H04W 88/085
USPC ................. 398/118, 122, 123, 128–131, 119
See application file for complete search history.

(56) References Cited

U.S. PATENT DOCUMENTS

| | | |
|---|---|---|
| 4,635,299 A | 1/1987 | MacGovern |
| 4,867,560 A | 9/1989 | Kunitsugu |

(Continued)

OTHER PUBLICATIONS

Birnbaum, K.M. et al., "Separating and tracking multiple beacon sources for deep space optical communications," IPN Progress Report 42-177, May 15, 2009, ten pages.

(Continued)

*Primary Examiner* — Hibret A Woldekidan
(74) *Attorney, Agent, or Firm* — Fenwick & West LLP

(57) ABSTRACT

A compact system for active co-boresight measurement includes a detector, a steering mirror, and a controller. The detector detects a portion of a transmission beam emitted by a transceiver and a portion of a received beam that is received from a remote terminal. The controller measures an offset between the detected portion of the received beam and the detected portion of the transmission beam. The controller controls a position of the steering mirror to align the portion of the received beam with a defined position on the detector, the defined position based in part on the offset.

17 Claims, 9 Drawing Sheets

(51) Int. Cl.
*G02B 26/08* (2006.01)
*H04B 10/112* (2013.01)
*H04J 14/08* (2006.01)
*H04J 14/00* (2006.01)
*H04B 10/516* (2013.01)

(56) References Cited

U.S. PATENT DOCUMENTS

| | | | | |
|---|---|---|---|---|
| 5,517,016 | A * | 5/1996 | Lesh | G01B 11/272 250/201.1 |
| 6,731,415 | B1 * | 5/2004 | Plett | H04B 10/1123 359/1 |
| 6,731,833 | B2 * | 5/2004 | Sandler | G02B 6/3588 385/16 |
| 6,819,874 | B2 * | 11/2004 | Cheng | H04B 10/1125 398/122 |
| 6,968,098 | B2 * | 11/2005 | Barrett | G02B 6/3588 385/15 |
| 8,362,410 | B2 * | 1/2013 | King | G02B 26/06 250/201.9 |
| 8,383,982 | B2 * | 2/2013 | Bruland | B23K 26/0613 219/121.69 |
| 10,298,325 | B1 * | 5/2019 | Birnbaum | H04B 10/1123 |
| 10,365,211 | B2 * | 7/2019 | Blasenheim | G01N 21/211 |
| 2004/0042798 | A1 * | 3/2004 | Kehr | H04B 10/1123 398/135 |
| 2004/0141754 | A1 | 7/2004 | Cheng et al. | |
| 2006/0024061 | A1 * | 2/2006 | Wirth | H04B 10/1125 398/129 |
| 2011/0268453 | A1 | 11/2011 | Fest et al. | |
| 2015/0188628 | A1 | 7/2015 | Chalfant, III et al. | |
| 2015/0215040 | A1 | 7/2015 | Dickson et al. | |
| 2015/0249498 | A1 * | 9/2015 | Minguez Rascon | B64D 39/00 244/135 A |
| 2017/0054499 | A1 | 2/2017 | Graves et al. | |
| 2019/0078858 | A1 * | 3/2019 | Miller | G01C 15/00 |

OTHER PUBLICATIONS

Russell, D. et al., "LaserCom Pointing Acquisition and Tracking Control using a CCD-based Tracker," SPIE: Free-Space Laser Communication Technologies VI, vol. 2123, Jan. 1994, pp. 294-303.
PCT International Search Report and Written Opinion, PCT Application No. PCT/US2017/055163, dated Jun. 11, 2018, fifteen pages.
Birnbaum, K.M. et al., "Separating and tracking multiple beacon sources for deep space optical communications," in SPIE, vol. 7587, 2010.
Blair, D. P. et al., "Phase sensitive detection as a means to recover signals buried in noise," Journal of Physics E: Scientific Instruments, vol. 8, 1975.
Chen et al., "High-speed optical links for UAV applications," Proc. of SPIE vol. 10096, Free-Space Laser Communication and Atmospheric Propagation XXIX, 1009615 (Mar. 7, 2017). [Online]. Available: http://proceedings.spiedigitallibrary.org/proceeding.aspx?doi=10.1117/12.2256248.
Clark, D.L. et al., "Application of single area array detector for ATP in space optical communications," SPIE, vol. 1044, 1989.
Greenwald, D. et al., "A beacon tracker and point ahead system for optical communications," SPIE, vol. 1111, 1989.
Hayden, W. et al., "Wide-band precision two-axis beam steerer tracking servo design and," SPIE, vol. 1866, 1993.
Lasala, P.V. et al., "Beam tracker and point ahead system for optical communications II—servo performance," SPIE, vol. 1482, 1991.
Masciotti, J. M. et al., "Digital lockin detection for discriminating multiple modulation frequencies with high accuracy and computational efficiency," IEEE Transactions on Instrumentation and Measurement, vol. 57, No. 1, 2008.
Orozco, L., "Use Synchronous Detection to Make Precision, Low Level Measurements," 2014.
Qi, C. et al., "Design of Dual-phase Lock-in Amplifier Used for Weak Signal Detection," IEEE, No. 1, 2016.
Razavi, B., "Design considerations for direct conversion receivers," IEEE Transactions on Circuits and Systems II, vol. 44, 1997.
Russell, D. et al., "LaserCom Pointing Acquisition and Tracking Control," SPIE, vol. 2123, 1994.
Xiaogang, H., et al., "Implementation of Digital Lock-in Amplifier," Journal of Physics: Conference Series, vol. 759, 2016.
European Patent Office, European Search Report and Opinion, European Patent Application No. 18161750.7, dated Oct. 4, 2018, seven pages.

* cited by examiner

700

```
┌─────────────────────────────────────────────────────────────────────────┐
│ Detect, by a detector, a portion of a transmission beam emitted by a    │
│ transceiver and a portion of a received beam that is received from a    │
│ remote terminal                                                         │
│ 710                                                                     │
└─────────────────────────────────────────────────────────────────────────┘
                                    │
                                    ▼
┌─────────────────────────────────────────────────────────────────────────┐
│ Measure an offset between the detected portion of the received beam     │
│ and the portion of the transmission beam                                │
│ 720                                                                     │
└─────────────────────────────────────────────────────────────────────────┘
                                    │
                                    ▼
┌─────────────────────────────────────────────────────────────────────────┐
│ Control a position of a steering mirror to align the portion of the     │
│ received beam with a defined position on the detector, the defined      │
│ position based in part on the offset                                    │
│ 730                                                                     │
└─────────────────────────────────────────────────────────────────────────┘
```

FIG. 7

COMPACT SYSTEM FOR ACTIVE CO-BORESIGHT MEASUREMENT IN A LASER COMMUNICATION SYSTEM

BACKGROUND

The present disclosure generally relates to a laser communication system, and specifically relates to a compact system for active co-boresight measurement used in a laser communication system.

Laser-based systems, such as laser communication systems, commonly employ multiple laser beams. A laser communication system can include two or more laser terminals (either stationary terminals or moving terminals) that communicate between each other by encoding information into laser beams. To exchange information data between two laser terminals of the laser communication system, each laser terminal transmits a laser beam with encoded data to another laser terminal and receives another beam with encoded data transmitted from the other laser terminal. In order to maximize communication performance of the laser communication system, a co-boresight angle between the transmission beam and the received beam needs to be within a specific threshold limit. A relative misalignment between communicated laser beams is typically measured using infrared cameras employed at each laser terminal of the laser communication system.

The conventional solution to this problem is to use some form of tracking to reject common-path disturbance, a separate mechanism to apply open-loop point-ahead, and careful opto-mechanical design techniques to minimize launch shift, jitter, and thermal drift effects that would otherwise contribute to misalignment between optical paths. Adjustment mechanisms are also built-in to the hardware design, which skilled engineers and technicians can use to achieve precision alignment during initial assembly. Unfortunately, this approach tends to drive up hardware complexity in the form of intricate mounting and adjustment features, tight machining tolerances, increased part quantity, and the use of exotic materials. Furthermore, the manual alignment process can be time-consuming and prone to quality issues, even for skilled engineers and technicians. For systems which require variable point-ahead, the point-ahead mechanism must make use of highly precise and repeatable position sensors, which can further increase cost and may even require their own calibration effort. The end result of this approach is a system that is very complex, and in turn, very expensive to produce.

SUMMARY

A compact boresight alignment system for active co-boresight measurement is presented herein. The compact system may be implemented as part of a laser terminal of a laser communication system that communicates with another (remote) laser terminal. The compact system includes a detector, a steering mirror, and a controller. The detector detects a portion of a transmission beam emitted by a transceiver and a portion of a received beam that is received from a remote terminal. The controller may be coupled to a transceiver of the laser terminal, the detector, and the steering mirror. The controller measures an offset between the detected received beam and a detected portion of the transmission beam. To align the transmission beam and the received beam, the controller controls a position of the steering mirror to align the portion of the detected portion of the received beam with a defined position on the detector, the defined position based in part on the offset.

BRIEF DESCRIPTION OF THE DRAWINGS

FIG. 7 is a flow chart illustrating a process of performing active co-boresight measurements, which may be implemented at the boresight alignment system in FIG. 5, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The teachings described herein may be used in laser communication systems. The teachings herein may be incorporated into (e.g., implemented within or performed by) laser terminals of a laser communication system. The laser terminals of the laser communication system communicate between each other using laser beams.

Figure 1:
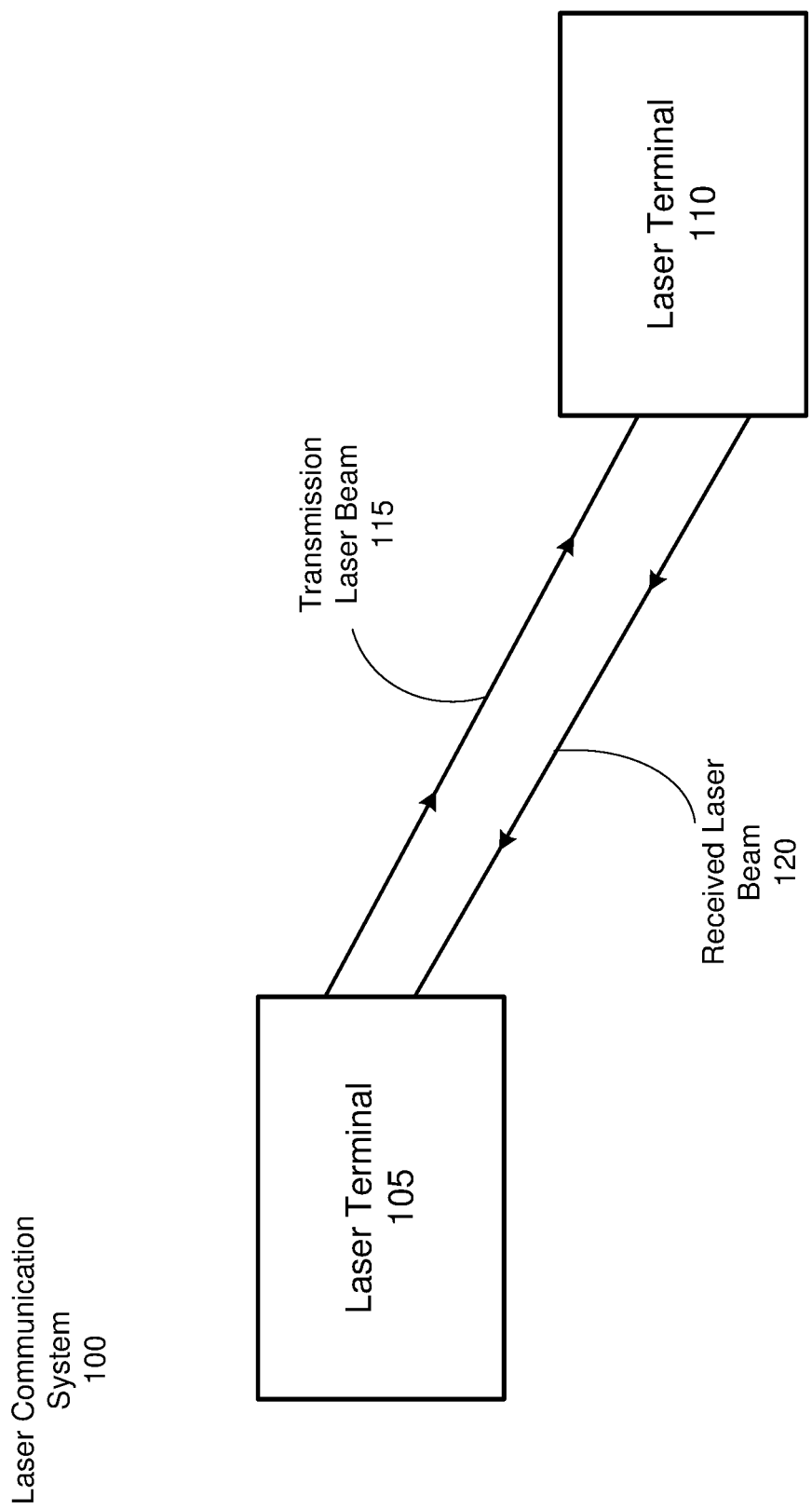
FIG. 1 is an example laser communication system comprising two communicating laser terminals, in accordance with embodiments of the present disclosure.

FIG. 1 is an example laser communication system 100 comprising two laser terminals 105, 110 that communicate with each other using laser beams, in accordance with embodiments of the present disclosure. In some embodiments, the laser terminals 105, 110 are far apart from each other, and the laser terminals 105, 110 have high velocities relative to each other. For example, the laser terminal 105 may be located at a ground station and the laser terminal 110 may be located on a satellite orbiting the Earth. In the illustrative embodiment of FIG. 1, the laser terminal 105 transmits a laser beam 115 to the laser terminal 110. The laser terminal 105 also receives a laser beam 120 transmitted from the laser terminal 110.

Performance of the laser communication system 100 depends on how well the transmission beam 115 and the received beam 120 are aligned. Typically, a line-of-sight (LOS) offset or a co-boresight angle between the transmission beam 115 and the received beam 120 is kept within a predetermined threshold limit. For the laser terminals 105, 110 that are far apart from each other and have high relative velocities, a specific LOS offset between the transmission beam 115 and the received beam 120 is preferred. The transmission beam 115 may be emitted with a specific point-ahead angle relative to the received beam 120, which allows photons of the transmission beam 115 to be properly received by the fast moving remote laser terminal 110.

A boresight alignment system presented in this disclosure allows measuring and adjustment, in closed loop, of a LOS offset (misalignment) between the transmission beam 115 and the received beam 120. The system can be implemented, for example, as part of the laser terminal 105. Similarly, the same system can be implemented as part of the laser terminal 110. Based on the measured misalignment, the system can actively realign the transmission beam 115 and/or the received beam 120 to reduce the misalignment below a predetermined threshold value. The system presented herein does not require sensors of a large format (e.g., infrared cameras). Instead, simple photodiode sensors can be used, such as a quad-cell photodiode or a lateral effect photodiode.

A laser terminal with a boresight alignment system of the present disclosure emits a transmission beam and receives a second laser beam (i.e., received beam). The boresight alignment system includes a detector and a plurality of steering mirrors. A portion of the light from the transmission beam is split off and provided to the detector, and a portion of the received beam is split off and provided to the detector. The transmission beam and the received beam are modulated differently (e.g., using different amplitude information signals). The boresight alignment system determines an offset between the transmission beam and the received beam based in part on the different modulations of the beams. In some embodiments, a calibration beam is further used to properly align the laser terminal. The boresight alignment system uses at least one of the steering mirrors to adjust the determined offset such that the offset is within a threshold value, as discussed in more detail in conjunction with FIGS. 2A-2C, FIG. 3.

A laser terminal with a compact co-boresight measurement system of the present disclosure emits a transmission beam and receives a second laser beam (i.e., received beam). The compact boresight alignment system includes a detector and a steering mirror. A portion of the light from the transmission beam is split off and provided to the detector, and a portion of the received beam is split off and provided to the detector. The transmission beam and the received beam are modulated differently (e.g., using two different amplitude information signals). An orientation of the steering mirror provides some portion (e.g., half) of a point ahead angle (e.g., 20 microradians—could also be zero) at which light is emitted toward (or ahead of) a remote laser terminal (receiver) that is moving relative to the laser terminal. The system monitors an offset between the transmission beam and the received beam based in part on the different modulations of the beams. The compact boresight alignment system adjusts the steering mirror to ensure the provided portion of the point ahead angle is maintained, as discussed in more detail in conjunction with FIGS. 4-5.

Figure 2A:
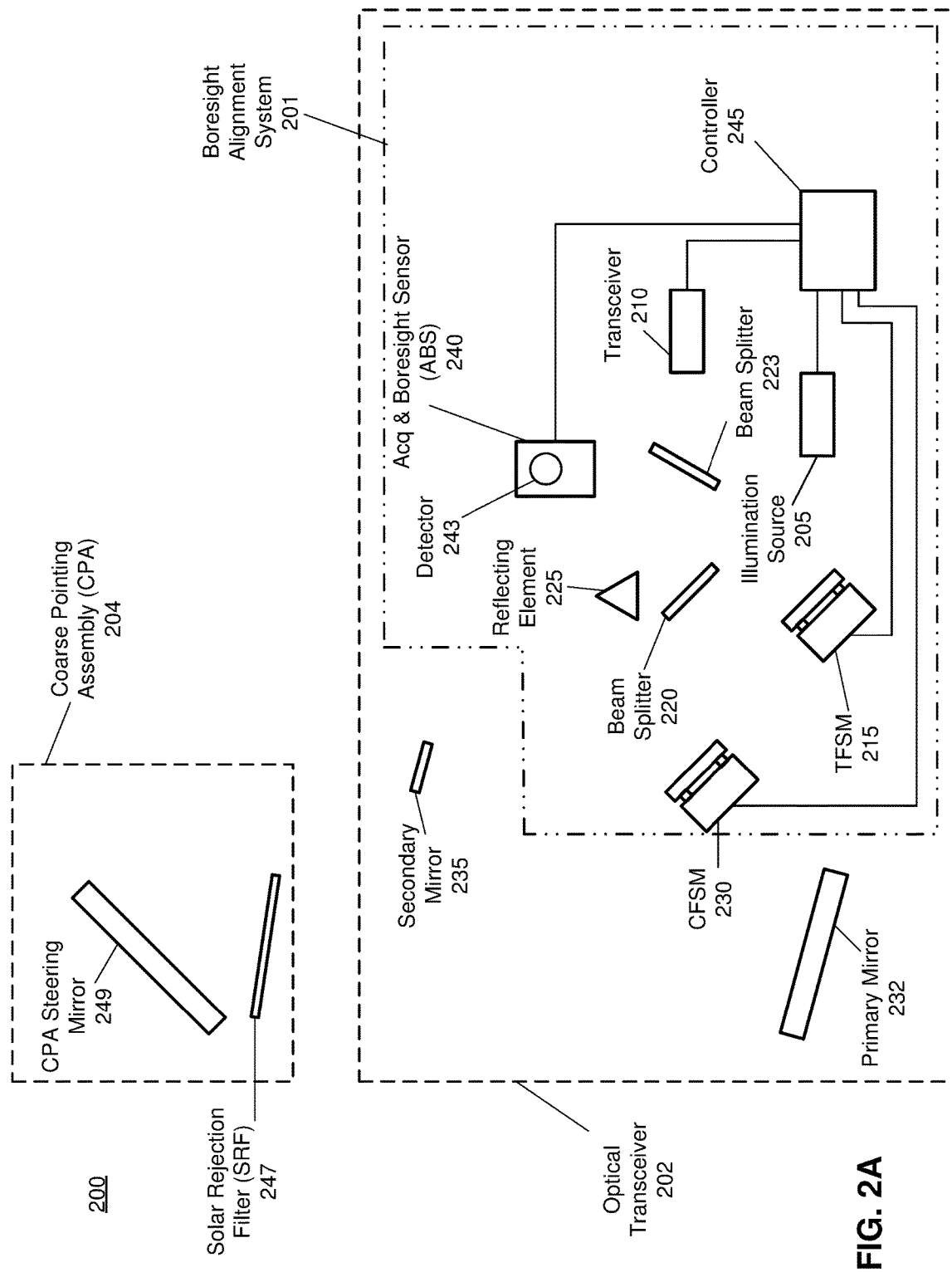
FIG. 2A is a laser terminal of a laser communication system, in accordance with an embodiment.

FIG. 2A illustrates a laser terminal 200 of a laser communication system (e.g., the laser communication system 100 in FIG. 1), in accordance with an embodiment. The laser terminal 200 may be an embodiment of the laser terminal 105 in FIG. 1. The laser terminal 200 includes a boresight alignment system 201 for performing active co-boresight measurements and boresight alignment for aligning a beam transmitted from the laser terminal 200 and a beam received at the laser terminal 200. As shown in FIG. 2A, the laser terminal 200 comprises an optical transceiver 202 and a course pointing assembly (CPA) 204. The boresight alignment system 201 is integrated into the optical transceiver 202, as discussed in more detail below in conjunction with FIGS. 2A-2C.

The optical transceiver 202 generates a transmission beam, e.g., for a remote laser terminal (e.g., the laser terminal 110 in FIG. 1), and directs the transmission beam to the CPA 204. The optical transceiver 202 also performs acquisition of a received beam, e.g., a beam received from the remote laser terminal. The optical transceiver 202 includes the boresight alignment system 201, and may optionally, include a primary mirror 232, and a secondary mirror 235. It should be understood that the optical transceiver 202 can include additional or different components from the components shown in FIG. 2A.

The boresight alignment system may include an illumination source 205, a transceiver 210, a transmission fast steering mirror (TFSM) 215, a beam splitter 220, a beam splitter 223, a reflecting element 225, a common fast steering mirror (CFSM) 230, an acquisition and boresight sensor (ABS) 240 with a detector 243, and a controller 245. It should be understood that the boresight alignment system 201 can include additional or different components from the components shown in FIG. 2A.

The illumination source 205 represents a source of a transmission beam of the laser terminal 200. The illumination source 205 can be implemented as a tunable laser. In some embodiments, the illumination source 205 is implemented as part of a transmit fiber collimator that may include a collimation assembly (not shown in FIG. 2A) positioned in front of the illumination source 205. In some embodiments, the illumination source 205 may include a laser source, an optical amplifier, and a collimator.

The transceiver 210 is configured to in-couple a beam of light. In addition, the transceiver 210 may be also configured to emit light—specifically, a calibration beam. The transceiver 210 may include a receiver, e.g., a photodetector (not shown in FIG. 2A), that captures an intensity signal associated with an in-coupled beam of light. In one embodiment, the photodetector of the transceiver 210 is implemented as an array of Single Photon Avalanche Diode (SPAD) pixels. In another embodiment, the photodetector of the transceiver 210 is implemented as one or more avalanche photodiodes. In some embodiments, the photodetector of the transceiver 210 is part of a receive fiber collimator (not shown in FIG. 2A) that includes a collimation assembly positioned in front of the photodetector. The transceiver 210 may also include a light emitter (e.g., a tunable laser, not shown in FIG. 2A) configured to emit a beam of light.

The TFSM 215 is an optical element that reflects and redirects a beam of light incident on a reflective surface of the TFSM 215. A position (which includes angular orientation) of the TFSM 215 can be adjustable, e.g., based on instructions from the controller 245. The TFSM 215 may be, e.g., an optical mirror coupled to a stage that can dynamically position the optical mirror with up to 6 degrees of freedom (DOF). The adjustable position of the TFSM 215 determines a direction of the beam of light reflected from the reflective surface of the TFSM 215. In some embodiments, a position of the TFSM 215 is defined based on, e.g., 6 DOF. In some embodiments, the TFSM 215 may adjust an optical power of incident light (e.g., the TFSM 215 focuses or defocuses incident light).

The beam splitter 220 splits incident light into two optical paths. The beam splitter 220 may be, e.g., a partially reflective mirror, a polarizing beam splitter, or some other optical device that splits light into two optical paths. For example, the beam splitter 220 may be a partially reflective mirror that transmits 5% of incident light and reflects 95% of incident light. Alternatively, the beam splitter 220 may be configured to provide a different ratio of transmitted light vs. reflected light. The beam splitter 220 may be coated with a metal or dichroic coating to reflect/transmit light of a certain wavelength or a range of wavelengths. Similarly, the beam splitter 223 splits incident light into two optical paths. The beam splitter 223 may be, e.g., a partially reflective mirror, a polarizing beam splitter, or some other optical device that splits light into two optical paths. For example, the beam splitter 223 may be a partially reflective mirror that reflects 5% of incident light and transmits 95% of incident light. Alternatively, the beam splitter 220 may be configured to provide a different ratio of transmitted light vs. reflected light. The beam splitter 223 may be coated with a metal or dichroic coating to reflect/transmit light of a certain wavelength or a range of wavelengths.

The reflecting element 225 reflects back incident light. In one embodiment of the optical transceiver 202 shown in FIG. 2B, the reflecting element 225 is implemented as a corner cube reflector that is configured to retro-reflect the incident light. In other embodiments, the reflecting element 225 is any device that that retro-reflects light. In an alternate embodiment (not shown) of the boresight alignment system 201, the reflecting element 225 is implemented as a flat mirror that reflects back the incident light.

The CFSM 230 is an optical element that reflects and redirects a beam of light incident on a reflective surface of the CFSM 230. A position (which includes angular orientation) of the CFSM 230 can be adjustable, e.g., based on instructions from the controller 245. The CFSM 230 may be, e.g., an optical mirror coupled to a stage that can dynamically position the optical mirror with up to 6 DOF. The adjustable position of the CFSM 230 determines a direction of the beam of light reflected from the reflective surface of the CFSM 230. In some embodiments, a position of the TFSM 230 is defined based on, e.g., 6 DOF. In some embodiments, the CFSM 230 may adjust an optical power of incident light (e.g., the CFSM 230 focuses or defocuses incident light).

The primary mirror 232 is configured to reflect an incident beam of light, e.g., to the CPA 204. The primary mirror 232 can be implemented to have an optical power in order to expand the reflected beam. A position of the primary mirror 232 may be adjustable, e.g., based on instructions from the controller 245. The secondary mirror 235 is configured to reflect an incident beam of light, e.g., to the primary mirror 232. A reflecting surface of the secondary mirror 235 is typically smaller than that of the primary mirror 232. The secondary mirror 235 can be also implemented to have an optical power in order to expand the reflected beam. Typically, an optical power of the secondary mirror 235 is smaller (in absolute value) than an optical power of the primary mirror 232. A position of the secondary mirror 235 may be adjustable, e.g., based on instructions from the controller 245.

The ABS 240 in-couples beams of light and acquires an intensity signal related to each in-coupled beam of light. The ABS includes the detector 243 that detects intensity signals related to the beams of light incident on a surface of the detector 243. In one embodiment, the detector 243 is implemented as a single package photodetector with segmented photodiodes, e.g., a quad cell photodetector with four separate active areas. The detector 243 implemented as a quad cell photodetector represents a simple detector architecture suitable for detecting an offset between locations of the detector 243 where two light beams are incident. In another embodiment, the detector 243 is implemented as a lateral-effect photodiode having a single unified structure. In some embodiments, the detector 243 is implemented as a camera with a relatively slow sampling rate. In other embodiments, the detector 243 may be implemented as a fast camera (e.g., a sampling rate of at least 3000 frames/second).

The controller 245 measures a co-boresight angle (LOS offset) between a laser beam transmitted from the laser terminal 200 to a remote terminal and another laser beam received at the laser terminal 200 that was transmitted from the remote terminal. Based on the measurement, the controller 245 controls the co-boresight angle to be within a predetermined threshold limit. The controller 245 may be coupled to the illumination source 205, the transceiver 210, the TFSM 215, the CFSM 230 and the ABS 240. In some embodiments, the controller is also coupled to some other elements of the optical transceiver 202, e.g., the primary and secondary mirrors 232, 235.

The controller 245 coupled to the illumination source 205 may control emission of light from the illumination source 205. For example, the controller 245 may control activation of the illumination source 245, an emission band of the emitted light, modulation of the emitted light, etc. The controller 245 coupled to the transceiver 210 may obtain information about light received at the transceiver 210, such as information about a modulation of the received light, information about an incident location of the received light on the photodetector of the transceiver 210, etc. The controller 245 may also control calibration of light emitted from the transceiver, e.g., based on the information about received light. The controller 245 may provide instructions to the TFSM 215 and/or the CFSM 230 so that the TFSM 215 and/or the CFSM 230 adjusts position(s). The controller 245 coupled to the ABS 240 and the detector 243 obtains information about one or more detected light beams incident on the detector 243. More details about operation of the controller 245 is provided in conjunction with FIGS. 2B-2C.

The CPA 204 in-couples a laser beam from the optical transceiver 202 and redirects the laser beam out of the laser terminal 200, e.g., to a remote laser terminal. In addition, the CPA 204 in-couples another laser beam, e.g., the laser beam transmitted from the remote laser terminal, and redirects the other laser beam to the optical transceiver 202. The CPA 204 includes a solar rejection filter (SRF) 247 and a CPA steering mirror 249. It should be understood that the CPA 204 can include additional or different components from the components shown in FIG. 2A. Additionally, it should be understood that in some embodiments, some (e.g., the SRF 247) or all of the CPA 204 is omitted from the laser terminal 200.

The SRF 247 in-couples light from the optical transceiver 202 and directs the in-coupled light to the CPA steering mirror 249. The SRF 247 can be implemented as an absorptive filter. Alternatively, the SRF 247 can be implemented as a beam splitter with a dichroic coating. In this case, a specific un-wanted portion of light from the optical transceiver 202 will not be in-coupled and directed to the CPA steering mirror 249, but instead can be directed to, e.g., a baffling system (not shown in FIG. 2A).

The CPA steering mirror 249 is an optical element that reflects and redirects light incident on a reflective surface of the CPA steering mirror 249. A position (which includes angular orientation) of the CPA steering mirror 249 may be adjustable, e.g., based on instructions from the controller 245. The CPA steering mirror 249 may be, e.g., an optical mirror coupled to a stage that can dynamically position the optical mirror with up to 6 DOF. A position of the CPA steering mirror 249 can be defined based on, e.g., 6 DOF. The CPA steering mirror 249 may be a flat mirror. Alternatively, CPA steering mirror 249 may have a curved reflective surface providing a certain optical power to the reflected and redirected light transmitted out of the laser terminal 200.

Figure 2B:
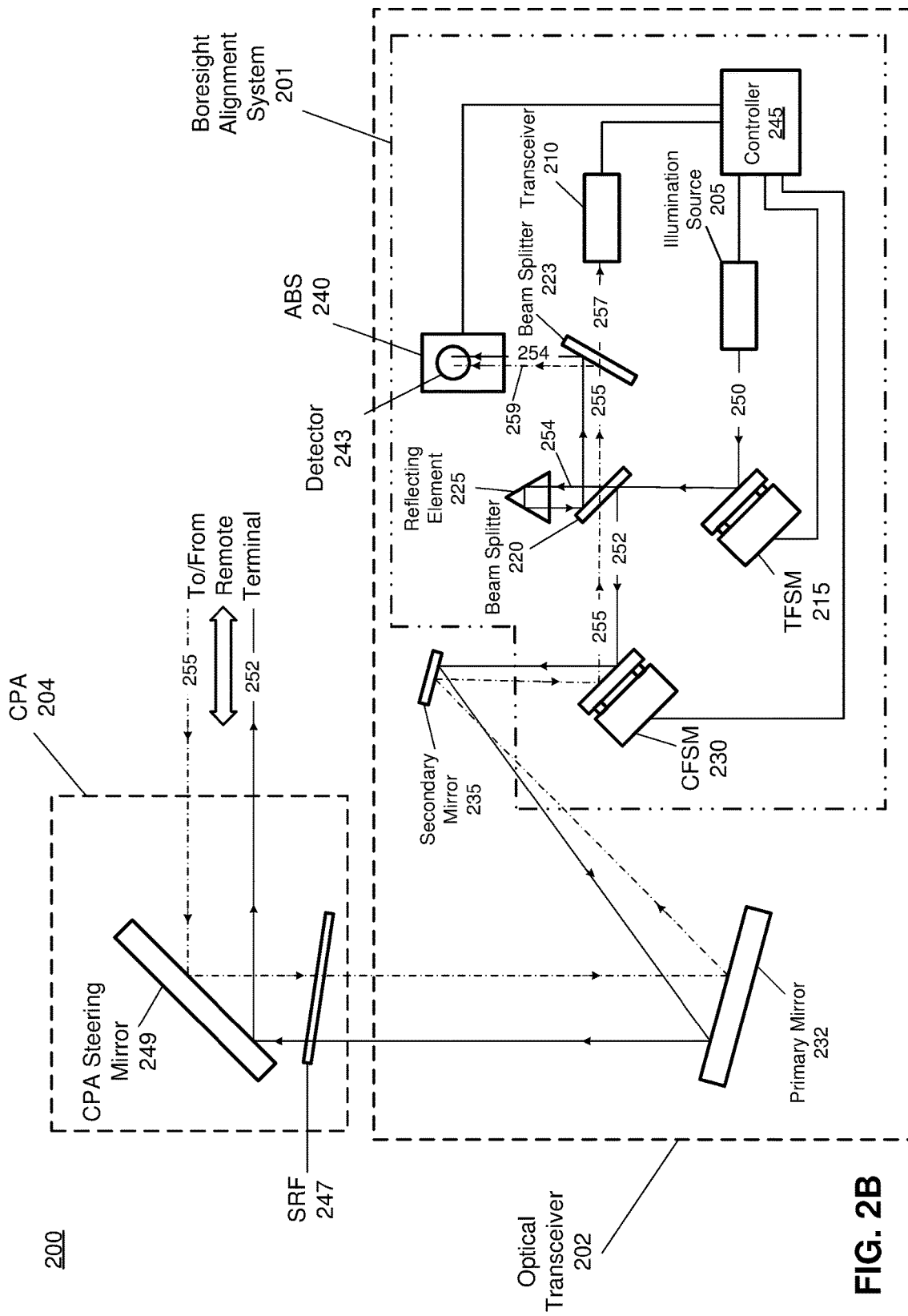
FIG. 2B illustrates operation of a first embodiment of the laser terminal of FIG. 2A, in accordance with an embodiment.

FIG. 2B illustrates operation of a first embodiment of the laser terminal 200 of FIG. 2A, in accordance with an embodiment. The illumination source 205 emits a transmission beam 250 toward the TFSM 215. The TFSM 215 redirects the transmission beam 250 toward the beam splitter 220. The beam splitter 220 splits a first transmission beam portion 252 off of the transmission beam 250, redirecting the first transmission beam portion 252 toward the CFSM 230. The CFSM 230 redirects the first transmission beam portion 252 onto the secondary mirror 235 that further redirects the first transmission beam portion 252 toward the primary mirror 232. Then, the primary mirror 232 redirects the first transmission beam portion 252 out of the optical transceiver 202 and into the CPA 204. The SRF 247 may filter the first transmission beam portion 252 and may propagate the first transmission beam portion 252 toward the CPA steering mirror 249. The CPA steering mirror 249 redirects the first transmission beam portion 252 and ejects the first transmission beam portion 252 out of the laser terminal 200, e.g., toward a remote laser terminal.

The beam splitter 220 splits a second transmission beam portion 254 off of the transmission beam 250, redirecting the second transmission beam portion 254 toward the reflecting element 225. In the embodiment of the boresight alignment system 201 shown in FIG. 2B, the reflecting element 225 is implemented as a retro-reflector, which is a corner cube reflector configured to retro-reflect the second transmission beam portion 254 back to the beam splitter 220. The beam splitter 220 directs the retro-reflected second transmission beam portion 254 to the beam splitter 223. The beam splitter 223 redirects the second transmission beam portion 254 toward the ABS 240 and the detector 243 for acquisition.

In addition to transmitting the first transmission beam portion 252 to the remote laser terminal and acquiring the second transmission beam portion 254 at the detector 243 of the ABS 240, the laser terminal 200 also performs an acquisition sequence discussed in more detail below in order to bring at least a portion of a received beam 255 into a field-of-view of the ABS 240 and the detector 243. In some embodiments, the beam 255 received at the laser terminal 200 is transmitted from a remote laser terminal that receives the first transmission beam portion 252. As shown in FIG. 2A, the laser terminal 200 in-couples the received beam 255 via the CPA 204. The CPA steering mirror 249 redirects the received beam 255 toward the optical transceiver 202. Before reaching the optical transceiver 202, the SRF 247 may filter the received beam 255 and propagate the received beam 255 toward the optical transceiver 202.

Within the optical transceiver 202, the received beam 255 is redirected by the primary and secondary mirrors 232, 235 toward the CFSM 230. The CFSM 230 then redirects the received beam 255 toward the beam splitter 220 which propagates the received beam 255 toward the beam splitter 223. The beam splitter 223 splits a first received beam portion 257 off of the received beam 255, redirecting the first received beam portion 257 toward the transceiver 210. The first received beam portion 257 contains most of the power of the received beam 255, e.g., approximately 95% of power.

The photodetector of the transceiver 210 (e.g., SPAD array or avalanche photodiode(s)) in-couples the first received beam portion 257.

In addition to directing the first received beam portion 257 toward the transceiver 210, the beam splitter 223 also splits a second received beam portion 259 off of the received beam 255, redirecting the second received beam portion 259 to the detector 243 of the ABS 240 for acquisition. Thus, the ABS 240 acquires both the second transmission beam portion 254 and the second received beam portion 259. In one embodiment, the detector 243 of the ABS 240 acquires the second transmission beam portion 254 and the second received beam portion 259 that are spatially overlapping. In an alternate embodiment, the detector 243 of the ABS 240 acquires the second transmission beam portion 254 and the second received beam portion 259 in different time instants.

The ABS 240 detects the second transmission beam portion 254 and the second received beam portion 259. The controller 245 separates (e.g., based in part on their different modulation) and digitally processes the detected light. To achieve the separation of information signals, the second transmission beam portion 254 and the second received beam portion 259 are modulated with unique and distinguishable modulation formats. A modulation format represents a distinguishable modulation scheme applied to an intensity signal associated with a beam of light to differentiate the beam of light from other beams. In one embodiment, the transmission beam 250 and the received beam 255 (and, consequently, the second transmission beam portion 254 and the second received beam portion 259 acquired by the detector 243) are modulated using amplitude modulation (AM) at different frequencies. In yet another embodiment, the transmission beam 250 and the received beam 255 are modulated using code division multiplexing (CDM), and in other embodiments, the modulation may be time-division multiplexing (TDM). In general, the transmission beam 250 emitted from the illumination source 205 (and consequently the second transmission beam portion 254 incident on the detector 243) may be modulated using a first modulation signal; and the received beam 255 (and consequently the second received beam portion 259 incident on the detector 243) may be modulated using a second modulation signal different than the first modulation signal. A modulation type describes how a signal is modulated—e.g., AM, CDM, or TDM. A modulation signal is an information signal used in the modulation process. For example, in FIG. 1, the second transmission beam portion 254 and the second received beam portion 259 are of the same modulation type—but each have a different modulation signal which facilitates the controller 245 in distinguishing between the two signals. Note in some embodiments a phase locked loop (PLL) may be used to assist in demodulating signals detected by the detector 243.

For a preferred level of communication between two remote laser terminals, the transmission beam 250 and the received beam 255 are aligned relative to each other within a predetermined threshold alignment value. In some embodiments, for laser terminals that are far apart from each other and have large relative velocities, a specific offset value (LOS offset or co-boresight angle) between the transmission beam 250 and the received beam 255 is preferred. The specific offset value may be set such that to result into highest signal-to-noise ratio (SNR) values for the transmission beam 250 and the received beam 255 among all SNR values tested during, e.g., calibration of a laser communication system involving the laser terminal 200 and the remote laser terminal. The specific offset value may change over time, e.g., based on relative positions and relative velocities of the laser terminal 200 and the remote laser terminal. The transmission beam 250 may be emitted with a specific point-ahead angle relative to the received beam 255, which allows transmission photons associated with the transmission beam 250 to be efficiently and accurately received by a fast moving remote leaser terminal. The boresight alignment system integrated into the optical transceiver 202 shown in FIG. 2B allows controlling the point-ahead angle of the transmission beam 250 (and a co-boresight angle between the transmission beam 250 and the received beam 255) in closed-loop by actively measuring and adjusting an offset between the second transmission beam portion 254 and the second received beam portion 259 acquired by the ABS 240, as discussed in more detail below.

The controller 245 may first instruct the CFSM 230 to adjust its position in order to re-align the received beam 255, and consequently to re-align the first received beam portion 257 and the second received beam portion 259. The controller 245 uses a scanning algorithm (e.g., a conical scan) to scan the second received beam portion 259 on the detector 243—which has the effect also of scanning the first received beam portion 257 that is captured by the transceiver 210. The controller 245 monitors power levels of the first received beam portion 257 during the scanning. The controller 245 determines an alignment position on the detector 243 for the second portion of the received beam 259 based on the monitored power levels, and instructs the CFSM 230 to direct the second received beam portion 259 to the alignment position (not this has the effect of also adjusting the orientation of the first received beam portion 257). It should be understood that a position of a steering mirror (e.g., the CFSM 230 or any other steering mirror) also refers to an angular orientation of the steering mirror. By adjusting the position of the CFSM 230, the controller 245 steers the received beam 255, and consequently, the controller 245 steers the first received beam portion 257 and the second received beam portion 259.

The controller 245 instructs the TFDM 215 to align the second transmission beam portion 254 with a defined position on the detector 243. Note that, the controller 245 can distinguish the second received beam portion 259 and the second transmission beam portion 254 based on unique modulation information of the second received beam portion 259 and the second transmission beam portion 254. The defined position corresponds to a point-ahead angle. And in cases where the point-ahead angle is zero, the defined position is the alignment position. Accordingly, the controller 245 would instruct the TFSM 215 to align the second transmission beam portion 254 with the alignment position on the detector 243. By adjusting the position of the TFSM 215, the controller 245 steers the first transmission beam portion 252 and the second transmission beam portion 254. Once the second received beam portion 259 is at the alignment position and the second transmission beam portion 254 is at the defined position, the corresponding first received beam portion 257 and first transmission beam portion 252 are aligned.

Figure 2C:
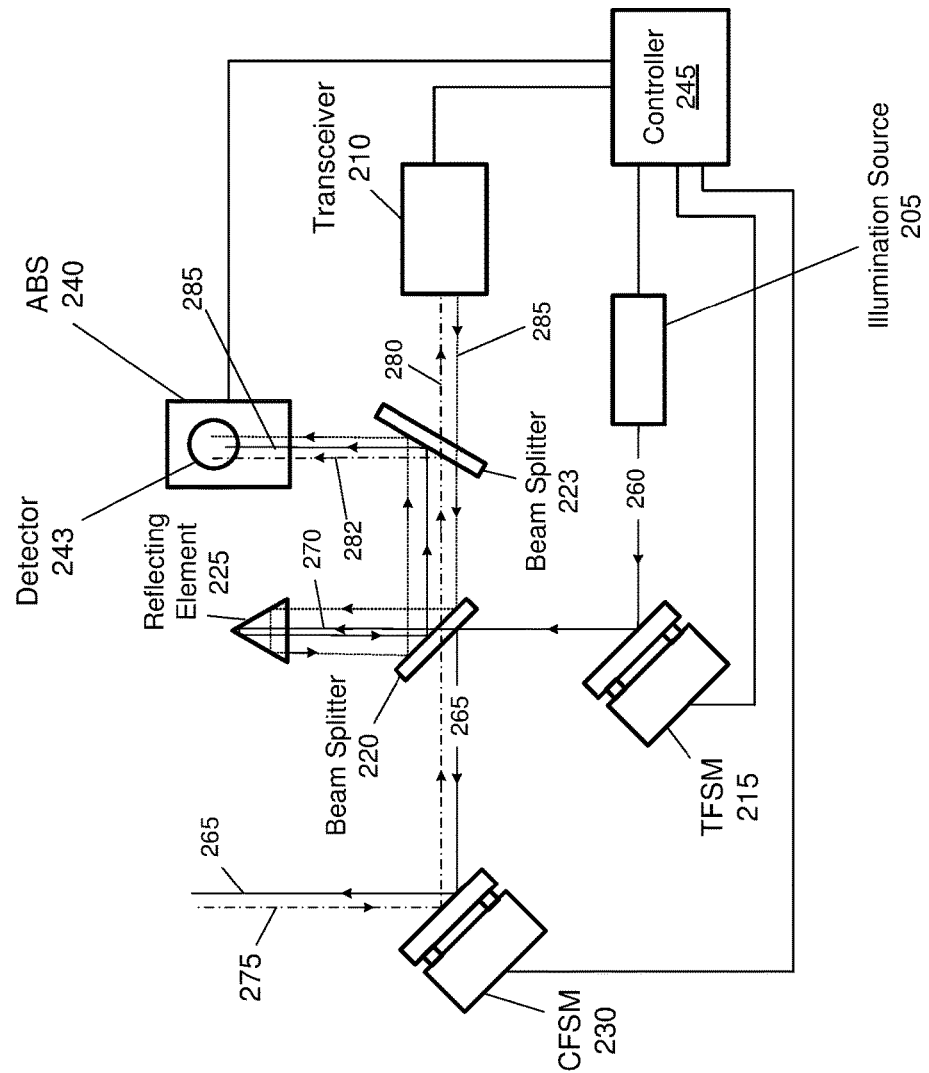
FIG. 2C illustrates an operation of a boresight alignment system, of the laser terminal of FIG. 2A, that uses a calibration beam, in accordance with an embodiment.

FIG. 2C illustrates an operation of the boresight alignment system 201, of the laser terminal 200 of FIG. 2A, using a calibration beam, in accordance with an embodiment. The illumination source 205 emits a transmission beam 260 toward the TFSM 215. The TFSM 215 redirects the transmission beam 260 toward the beam splitter 220. The beam splitter 220 splits a first transmission beam portion 265 off of the transmission beam 260, redirecting the first transmission beam portion 265 toward the CFSM 230. The CFSM 230 redirects the first transmission beam portion 265 onto the secondary mirror 235 that further redirects it to other components of an optical transceiver (e.g., the optical transceiver 202).

The beam splitter 220 also splits a second transmission beam portion 270 off of the transmission beam 260, redirecting the second transmission beam portion 270 toward the reflecting element 225. In the embodiment of the optical transceiver 202 shown in FIG. 2C, the reflecting element 225 is implemented as retro-reflector that retro-reflects the second transmission beam portion 270 back to the beam splitter 220, and the beam splitter 220 reflects the second transmission beam portion 270 toward the beam splitter 223. The beam splitter 223 redirects the second transmission beam portion 270 toward the detector 243 of the ABS 240 for acquisition.

The boresight alignment system 201 receives a received beam 275. The CFSM 230 redirects the received beam 275 toward the beam splitter 220 which propagates the received beam 275 toward the beam splitter 223. The beam splitter 223 propagates at least a portion of the received beam 275 as light 280 toward the photodetector of the transceiver 210 that in-couples the light 280, and a second portion of the light 275, referred to as light 282, is reflected towards the detector 243. Note that the controller 245 can be configured to control a position of the CFSM 230 in order to steer the received beam 275 to a preferred coupling position on the photodetector of the transceiver 210.

The transceiver 210 emits a calibration beam 285 toward the beam splitter 223, e.g., based on emission instructions from the controller 245 coupled to the transceiver 210. The calibration beam 285 has a same modulation type, but different modulation information from the received beam 275 and the transmission beam 260. The beam splitter 223 propagates the calibration beam 285 toward the beam splitter 220, and the beam splitter 220 redirects the calibration beam 285 toward the reflecting element 225. The reflecting element 225 retro-reflects the calibration beam 285 back to the beam splitter 220. The beam splitter 220 redirects the calibration beam 285 to the beam splitter 223, and the beam splitter 223 redirects the calibration beam 285 toward the detector 243 of the ABS 240 for acquisition. The calibration beam 285 may be aligned (e.g., based on the emission instructions from the controller 245) with the received beam 280 such that an offset between the calibration beam 285 and the received beam 280 is less than a predetermined threshold value. Therefore, the controller 245 has information about a first offset between a position on the photodetector of the transceiver 210 where the received beam 280 is incident and a position on the detector 243 of the ABS 240 where the calibration beam 285 is incident.

The controller 245 has a desired second offset between the calibration beam 285 and the second transmission beam portion 270. The offset corresponds to the point head angle. In embodiments, where the point ahead angle is zero, the controller 245 uses the TFSM 215 to position the second transmission beam portion 270 over the calibration beam 285 on the detector 243. Alignment is discussed in detail with regard to FIG. 3. Note, one advantage of the boresight alignment system 201 as operated in FIG. 2C is that alignment can be obtained without using a conical scan. A conical scan inherently adds pointing error in order to work, so by omitting this step, the boresight alignment system 201 is able to come to a more accurate alignment.

Figure 3:
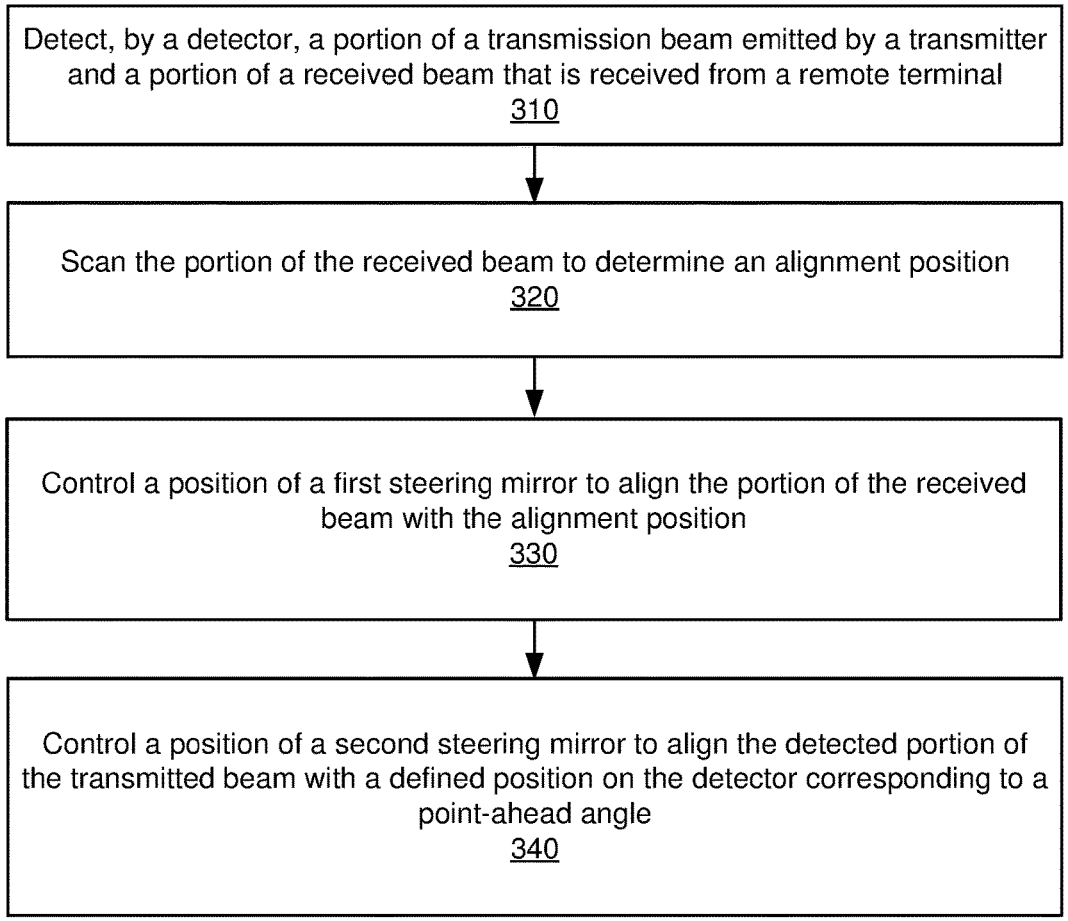
FIG. 3 is a flow chart illustrating a process of performing active co-boresight measurements, which may be implemented at the laser terminal shown in FIG. 2A, in accordance with an embodiment.

FIG. 3 is a flow chart illustrating a process 300 of performing active co-boresight measurements, which may be implemented at the laser terminal 200 shown in FIG. 2A in accordance with an embodiment. The process 300 of FIG. 3 may be performed by the components of a boresight alignment system implemented at the laser terminal 200. Other entities may perform some or all of the steps of the process in other embodiments. Likewise, embodiments may include different and/or additional steps, or perform the steps in different orders.

The system detects 310 (e.g., via a detector) a portion of a transmission beam emitted by a transmitter and a portion of a received beam that is received from a remote terminal (e.g., the laser terminal 110 shown in FIG. 1). The transmission beam is modulated using a first modulation format and the received beam is modulated using a second modulation format different than the first modulation format. In some embodiments, the detector is selected from the group consisting of a quad-cell photodiode and a lateral effect photodiode.

The system scans 320 (e.g., via a controller coupled to the receiver, the detector, a first steering mirror, and a second steering mirror) the detected portion of the received beam to determine an alignment position. The system changes the position, via an algorithm, of the first steering mirror to steer an in-coupled portion of the received beam (i.e., the portion received by the transceiver 210) and the detected portion of the received beam. The algorithm may be, e.g., a conical scanning algorithm. The system monitors power levels of the in-coupled portion of the received beam during the scanning. For example, using a conical scanning algorithm, if the measured power levels are constant or within some threshold range of each other (e.g., vary be less than 1%)—the detected portion of the received beam is at the alignment position (and hence the in-coupled portion of the received beam is properly aligned). However, if the measured power levels are outside of the threshold range of variance (e.g., vary by more than 1%), the system can determine a location of the alignment position based on the variance in power levels. For example, the system may identify a location of the alignment position using values and locations of the lowest power level and a highest power level.

The system controls 330 (e.g., via the controller) a position of the first steering mirror to align the portion of the received beam with the alignment position on the detector. Note that this also aligns the in-coupled portion of the received beam.

The system controls 340 (e.g., via the controller) a position of the second steering mirror to align the detected portion of the transmission beam with a defined position on the detector that corresponds to a point-ahead angle. Once the detected portion of the received beam portion is at the alignment position and the detected portion of the transmission beam is at the defined position, the in-coupled portion of the received beam and the transmission beam are aligned. Note, the transmission beam may be adjusted to be within the threshold limit results in improved communication accuracy between two remote laser terminals having large relative velocities (in the case of a non-zero point-ahead angle). In embodiments, where the point ahead angle is zero, the system aligns the detected portion of the transmission beam with the alignment position.

Figure 4:
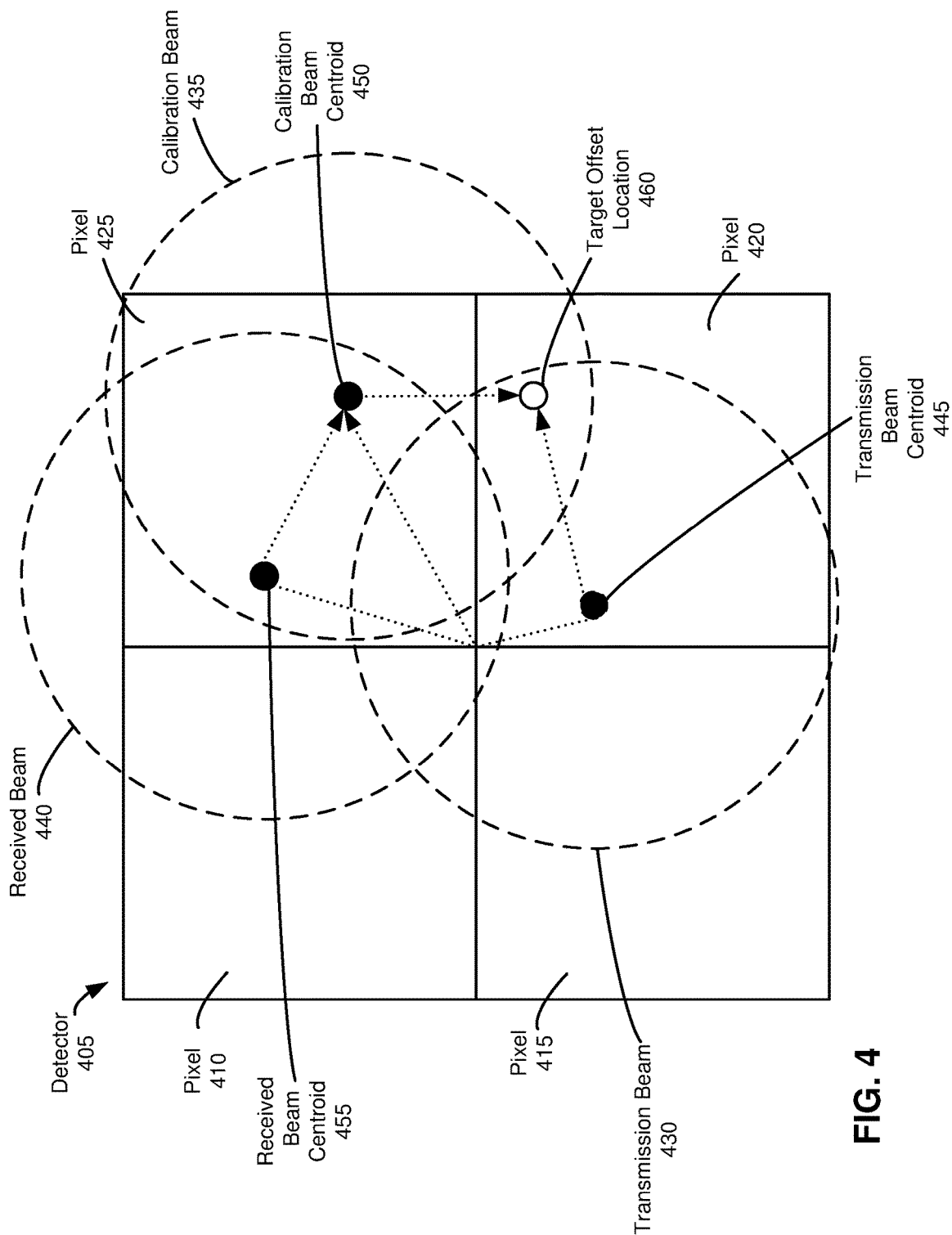
FIG. 4 illustrates an alignment process using a quad cell detector of a boresight alignment system of FIG. 2C, in accordance with an embodiment.

FIG. 4 illustrates an alignment process using a detector 405 of the boresight alignment system 201 of FIG. 2C, according to an embodiment. The detector 405 is a quad cell detector, and is an embodiment of the detector 243. The quad cell detector has for pixels 410, 415, 420, and 425. In FIG. 4, a portion of a transmission beam (transmission beam) 430, a portion of a calibration beam (calibration beam) 435, and a portion of a received beam (received beam) 440 are all incident on the detector 405. Note that the transmission beam 430, the calibration beam 435, and the received beam 440 may actually be incident on a plurality of pixels (i.e., 410, 415, 420, and/or 425) at a given time. A controller (e.g., the controller 243) is able to distinguish between the transmission beam 430, the calibration beam 435, and the received beam 440 because they each have different modulation information.

For a given beam, the controller determines what amount of energy is detected by each of the pixels 410-425, and uses the determined amounts to calculate a centroid location for that beam. Accordingly, the controller determines a transmission beam centroid 445, a calibration beam centroid 450, and a received beam centroid 455 for the transmission beam 430, the calibration beam 435, and the received beam 440, respectively.

The controller uses a TFSM (e.g., the TFSM 215) to adjust the transmission beam centroid 445 such that it overlays a target offset location 460. Note, if the target point-ahead angle is zero, then the controller uses the TFSM to adjust the transmission beam centroid such that it overlays the calibration beam centroid 450. The controller uses a CFSM (e.g., the CFSM 230) to adjust the received beam centroid 455 such that it overlays with the calibration beam centroid 450.

Figure 5:
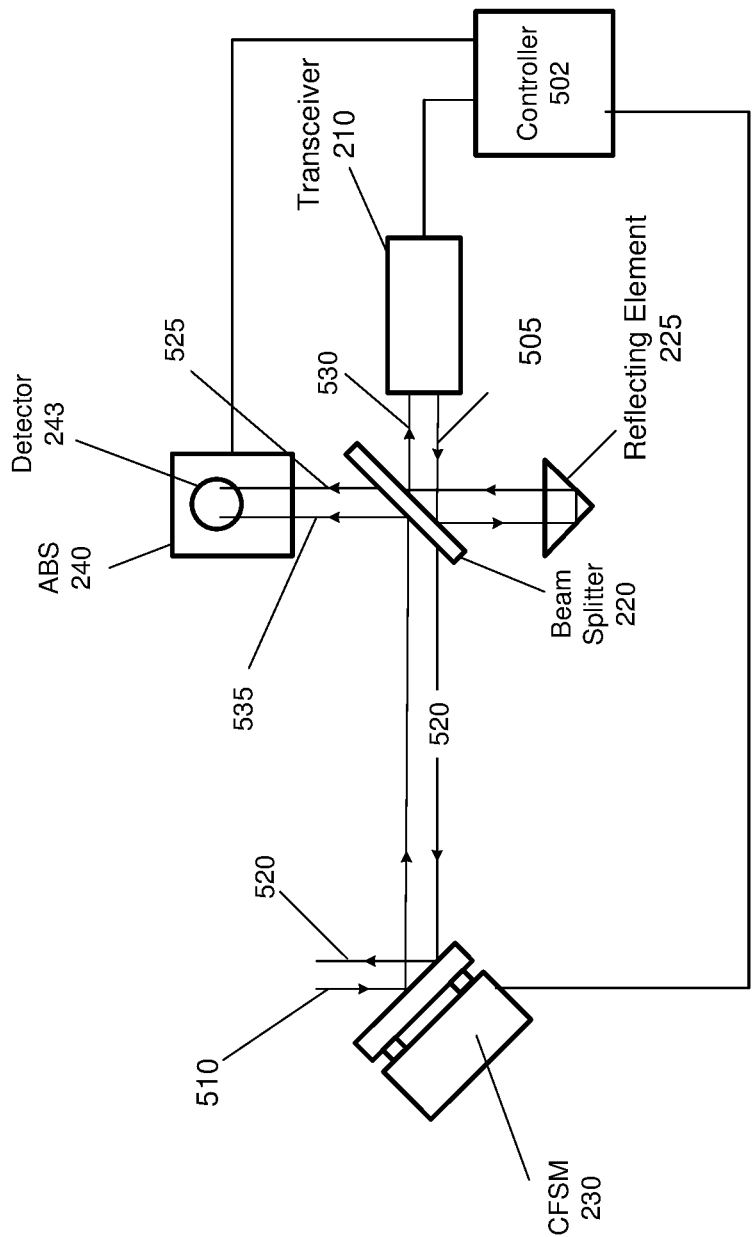
FIG. 5 is a laser terminal that includes a compact boresight alignment system, in accordance with an embodiment.

FIG. 5 illustrates a compact boresight alignment system 500, in accordance with an embodiment. The compact alignment system 500 may be part of an optical transceiver 202. The compact boresight alignment system 500 aligns a beam transmitted from a laser terminal and a beam received at the laser terminal. As shown in FIG. 5, the compact boresight alignment system 500, henceforth referred to as a boresight alignment system 500, includes the transceiver 210, the beam splitter 220, the reflecting element 225, the CFSM 230, the ABS 240, and a controller 502. It should be understood that the optical transceiver 402 can include additional or different components from the components shown in FIG. 4.

The transceiver 210 generates a transmission beam 505, e.g., for a remote laser terminal (e.g., the laser terminal 110 in FIG. 1), and directs at least a portion of the transmission beam 505 to other components of an optical transceiver (e.g., the optical transceiver 202). The boresight alignment system 500 receives a received beam 510 (e.g., received from a remote laser terminal).

The transceiver 210 emits the transmission beam 505 toward the beam splitter 220. The beam splitter 220 splits a first transmission beam portion 520 off of the transmission beam 505, redirecting the first transmission beam portion 520 toward the CFSM 230. The CFSM 230 redirects the first transmission beam portion 520 toward other optical elements in the optical transceiver. For example, the first transmission beam portion may be provided to a beam expander (BET) that expands the beam prior to outputting it from the laser terminal.

The beam splitter 220 splits a second transmission beam portion 525 off of the transmission beam 505, redirecting the second transmission beam portion 525 toward the reflecting element 225. The reflecting element 225 is implemented as a retro-reflector, which is a corner cube reflector configured to retro-reflect the second transmission beam portion 525 back to the beam splitter 220. The beam splitter 220 propagates the second transmission beam portion 525 toward the ABS 240 and the detector 243 for acquisition.

The boresight alignment system 500 receives a received beam 510. The received beam 510 originated from some remote laser terminal that receives the first transmission beam portion 520. The CFSM 230 redirects the received beam 510 toward the beam splitter 220. The beam splitter 220 splits a first received beam portion 530 off of the received beam 510, redirecting the first received beam portion 530 toward the transceiver 210 that in-couples the first received beam portion 530, e.g., at the photodetector of the transceiver 210.

In addition to directing the first received beam portion 530 toward the transceiver 210, the beam splitter 220 also splits a second received beam portion 535 off of the received beam 510, redirecting the second received beam portion 535 to the ABS 240 for acquisition. Thus, the ABS 240 acquires both the second transmission beam portion 525 and the second received beam portion 535.

The controller 502 separates and digitally processes signals detected by the detector 243 of the ABS 240. Similar to what is discussed above with reference to FIG. 2A, the modulation type of the second transmission beam portion 525 and the second received portion 535 are the same, but the modulation information is different for each of the second transmission beam portion 525 and the second received portion 535. Accordingly, the controller 502 is able to distinguish between the second transmission beam portion 525 and the second received portion 535 using signals from the detector 243.

For a preferred level of communication between two remote laser terminals, the transmission beam 505 and the received beam 510 are aligned relative to each other within a predetermined threshold alignment value. In some embodiments, for laser terminals that are far apart from each other and have large relative velocities, a specific offset value (LOS offset or co-boresight angle) between the transmission beam 505 and the received beam 510 is preferred. The specific offset value may be set such that to result into highest SNR values for the transmission beam 505 and the received beam 510 among all SNR values tested during, e.g., calibration of a laser communication system involving a laser terminal including the boresight alignment system 500 and the remote laser terminal. The specific offset value may change over time, e.g., based on relative positions and relative velocities of the laser terminal and the remote laser terminal. The transmission beam 505 may be emitted with a specific point-ahead angle relative to the received beam 510, which allows transmission photons associated with the transmission beam 505 to be efficiently and accurately received by the fast moving remote terminal. The boresight alignment system 500 allows controlling at least a portion of the point-ahead angle of the transmission beam 505 in closed-loop by actively measuring and adjusting an offset between the second transmission beam portion 525 and the second received beam portion 535 acquired by the ABS 240, as discussed in more detail below with regard to FIG. 6. Note, one advantage of the boresight alignment system 500 is that alignment can be obtained without using a conical scan. A conical scan inherently adds pointing error in order to work, so by omitting this step, the boresight alignment system 500 is able to come to a more accurate alignment. Moreover, relative to the embodiment discussed above with reference to FIG. 2C, the boresight alignment system 500 is much simpler (e.g., there is no calibration beam).

Figure 6:
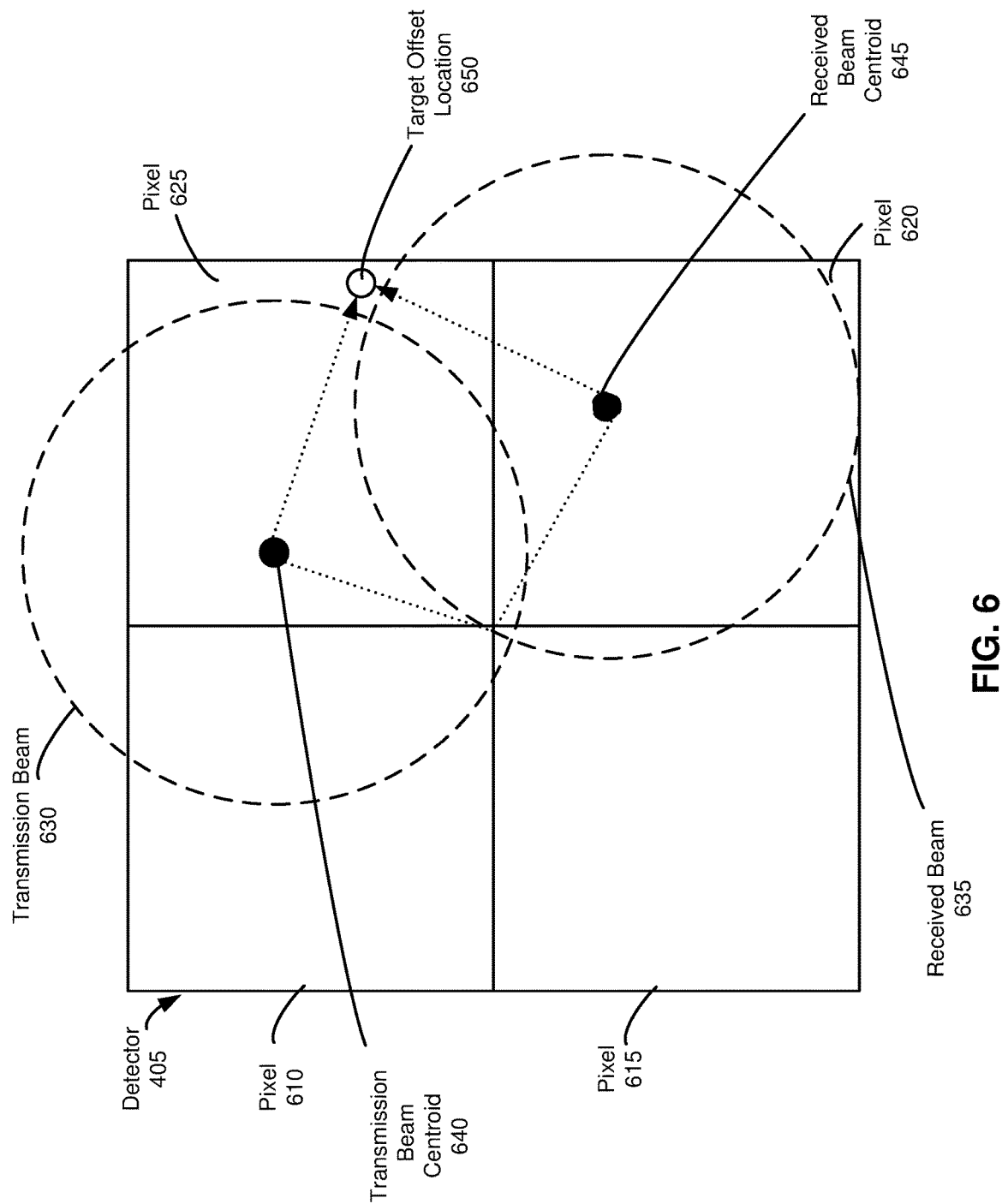
FIG. 6 illustrates an alignment process using a detector of a boresight alignment system of FIG. 5, in accordance with an embodiment

FIG. 6 illustrates alignment using a detector 605 of the boresight alignment system 500 of FIG. 5, according to an embodiment. The detector 605 is a quad cell detector, and is an embodiment of the detector 243. The quad cell detector has for pixels 610, 615, 620, and 625. In FIG. 6, a portion of a transmission beam (transmission beam) 630, and a portion of a received beam (received beam) 635 are all incident on the detector 605. Note that the transmission beam 630 and the received beam 635 may actually be incident on a plurality of pixels (i.e., 610, 615, 620, and/or 625) at a given time. A controller (e.g., the controller 502) is able to distinguish between the transmission beam 630 and the received beam 635 because they each have different modulation information.

For a given beam, the controller determines what amount of energy is detected by each of the pixels 610-625, and uses the determined amounts to calculate a centroid location for that beam. Accordingly, the controller determines a transmission beam centroid 640 and a received beam centroid 645 for the transmission beam 630 and the received beam 635, respectively.

The controller uses a CFSM (e.g., the CFSM 230) to adjust the received beam centroid 645 such that it overlays a target offset location 650. The location of the target offset location 650 is based on a target point ahead angle. If, for example, the point ahead angle is zero, then the controller uses the CFSM to overlay the received beam centroid 645 on the transmission beam centroid 630.

FIG. 7 is a flow chart illustrating a process 700 of performing active co-boresight measurements, which may be implemented at the boresight alignment system 500 in FIG. 5, in accordance with an embodiment. The process 700 of FIG. 7 may be performed by the boresight alignment system 500. Other entities may perform some or all of the steps of the process in other embodiments. Likewise, embodiments may include different and/or additional steps, or perform the steps in different orders.

The system detects 710 (e.g., via a detector) a portion of a transmission beam emitted by a transceiver and a portion of a received beam that is received from a remote terminal. The transmission beam and the received beam each have a same modulation type—but have different modulation information. The system detects, e.g., using a quad-cell detector, the portion of the transmission beam and the portion of the received beam based in part on the differences of modulation information.

The system measures 720 (e.g., via a controller coupled to the transceiver, the detector, and a steering mirror) an offset between a portion of the received beam that is in-coupled at the transceiver and the detected portion of the received beam. The system changes the position of the steering mirror to steer the in-coupled portion received beam to a target location. The system obtains, for different positions of the steering mirror, information about multiple detection positions on the transceiver and the detector where the in-coupled portion of the received beam and the detected portion of the received beam are incident.

The system controls 730 (e.g., via the controller 502) a position of the steering mirror to align the portion of the received beam with a defined position on the detector (i.e., the target offset location). The defined position may be based in part on the offset. In embodiments, where the point ahead angle is zero, the system controls the position of the steering mirror such that the portion of the received beam overlays the portion transmission beam.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A boresight alignment system comprising:
   a detector configured to detect amounts of energies related to a portion of a transmission beam emitted by a transceiver and a portion of a received beam that is received from a remote terminal; and
   a controller coupled to the transceiver, the detector, and a steering mirror, the controller configured to:
      determine a transmission beam centroid for the portion of the transmission beam and a received beam centroid for the portion of the received beam, based on the detected amounts of energies,
      measure an offset between the transmission beam centroid and the received beam centroid, and
      control, based on the offset, a position of the steering mirror to overlay the received beam centroid with a target offset location on the detector, the target offset location based on a target point ahead angle.

2. The boresight alignment system of claim 1, wherein the transmission beam and the received beam are modulated using a same modulation type, and the transmission beam is modulated with a first information signal and the received beam is modulated with a second modulation signal that is different than the first modulation signal.

3. The boresight alignment system of claim 2, wherein the modulation type is selected from a group consisting of: amplitude modulation (AM), time division multiplexing (TDM), and code division multiplexing (CDM).

4. The boresight alignment system of claim 1, wherein the detector is selected from the group consisting of a quad-cell photodiode and a lateral effect photodiode.

5. The boresight alignment system of claim 1, further comprising a beam splitter and a retro-reflector, wherein:
   the beam splitter splits the portion of the transmission beam off of the transmission beam and redirects the portion of the transmission beam to the retro-reflector,
   the retro-reflector retro-reflects the portion of the transmission beam back to the beam splitter, and
   the beam splitter propagates the portion of the transmission beam reflected from the retro-reflector toward the detector.

6. The boresight alignment system of claim 1, further comprising a beam splitter configured to split the portion of the received beam off of the received beam and redirect the portion of the received beam to the detector.

7. The boresight alignment system of claim 1, wherein the target point ahead angle is zero and the target offset location corresponds to a location of the transmission beam centroid on the detector.

8. A method comprising:
   detecting, by a detector of a laser terminal, amounts of energies related to a portion of a transmission beam emitted by a transceiver and a portion of a received beam that is received from a remote terminal;
   determining a transmission beam centroid for the portion of the transmission beam and a received beam centroid for the portion of the received beam, based on the detected amounts of energies;
   measuring an offset between the transmission beam centroid and the received beam centroid; and
   control, based on the offset, a position of the steering mirror to overlay the received beam centroid with a target offset location on the detector, the target offset location based on a target point ahead angle.

9. The method of claim 8, further comprising:
   modulating the transmission beam with a first modulation signal using a modulation type, wherein the received beam is modulated with a second modulation signal using the modulation type, and the second modulation signal is different than the first modulation signal; and
   detecting the portion of the transmission beam and the portion of the received beam based on the first modulation information and the second modulation information.

10. The method of claim 9, wherein the modulation type is selected from a group consisting of: amplitude modulation (AM), time division multiplexing (TDM), and code division multiplexing (CDM).

11. The method of claim 8, further comprising:
    splitting, by a beam splitter, the portion of the transmission beam off of the transmission beam;

redirecting the portion of the transmission beam to a retro-reflector;

reflecting the portion of the transmission beam from the retro-reflector back to the beam splitter; and propagating the portion of the transmission beam reflected from the retro-reflector toward the detector.

12. The method of claim 8, further comprising:

splitting, by a beam splitter, the portion of the received beam off of the received beam; and redirecting, by the beam splitter, the portion of the received beam to the detector.

13. The method of claim 8, wherein the target point ahead angle is zero and the target offset location corresponds to a location of the transmission beam centroid on the detector.

14. A system comprising:

a transceiver configured to:

emit a transmission beam, and in-couple a portion of a received beam that is received from a remote terminal;

a detector configured to detect amounts of energies related to a portion of the transmission beam and another portion of the received beam;

a steering mirror; and a controller coupled to the transceiver, the detector, and the steering mirror, the controller configured to:

determine a transmission beam centroid for the portion of the transmission beam and a received beam centroid for the other portion of the received beam, based on the detected amounts of energies, measure an offset between the transmission beam centroid and the received beam centroid, and control, based on the offset, a position of the steering mirror to overlay the received beam centroid with a target offset location on the detector, the target offset location based on a target point ahead angle.

15. The system of claim 14, wherein the transmission beam and the received beam are modulated using a same modulation type, and the transmission beam is modulated with a first information signal and the received beam is modulated with a second modulation signal that is different than the first modulation signal.

16. The system of claim 15, wherein the modulation type is selected from a group consisting of: amplitude modulation (AM), time division multiplexing (TDM), and code division multiplexing (CDM).

17. The system of claim 14, wherein the detector is selected from the group consisting of a quad-cell photodiode and a lateral effect photodiode.

* * * * *